June 23, 1936.    S. J. HARLEY    2,045,464
SLIDE BEARING
Filed Sept. 22, 1933    2 Sheets-Sheet 1

INVENTOR:-
Stanley J. Harley
by Richard E. Babcock
Attorney

June 23, 1936.   S. J. HARLEY   2,045,464
SLIDE BEARING
Filed Sept. 22, 1933    2 Sheets-Sheet 2

Patented June 23, 1936

2,045,464

UNITED STATES PATENT OFFICE 2,045,464

SLIDE BEARING

Stanley Jaffa Harley, Stivichall, Coventry, England

Application September 22, 1933, Serial No. 690,598

4 Claims. (Cl. 308—6)

This invention is applicable to apparatus of all kinds in which there is relative sliding movement between one part and another but more especially where, as in machine tools, the movable part is provided adjacent one edge with a V-section rib engaging a correspondingly shaped groove in the relatively stationary part and with a plain surface adjacent the other edge bearing upon a plain surface on the said other part. For all ordinary purposes this combination of V-section and plain bearing surfaces is quite satisfactory since it leaves the sliding member free to accommodate itself in a lateral direction to any inaccuracies in the V-groove or rib without setting up any binding action.

For precision work, however, and especially where a delicate adjustment of a comparatively heavy headstock or slide is required, it is found that when moving the head or slide from a state of rest a certain effort is needed to overcome the adhesion between the bearing surfaces which is due to the high and accurate finish obtained by grinding and lapping. Where the area of the bearing surfaces in contact is considerable part of the initial effort required may be absorbed in stressing the adjusting means instead of moving the head or slide and a false adjustment thereby results.

The object of the present invention is to provide for fine and accurate adjustment of the movable member by the provision of an improved mounting therefor whereby the said member is rendered extremely sensitive to any force tending to move it from the static condition.

The invention consists in the substitution for the present continuous plain surface contact between the relatively movable members of a rolling contact and involves the provision in combination with either the movable or the relatively stationary member of a plurality of roller bearings arranged in parallel series.

In the accompanying drawings.

Figure 1:
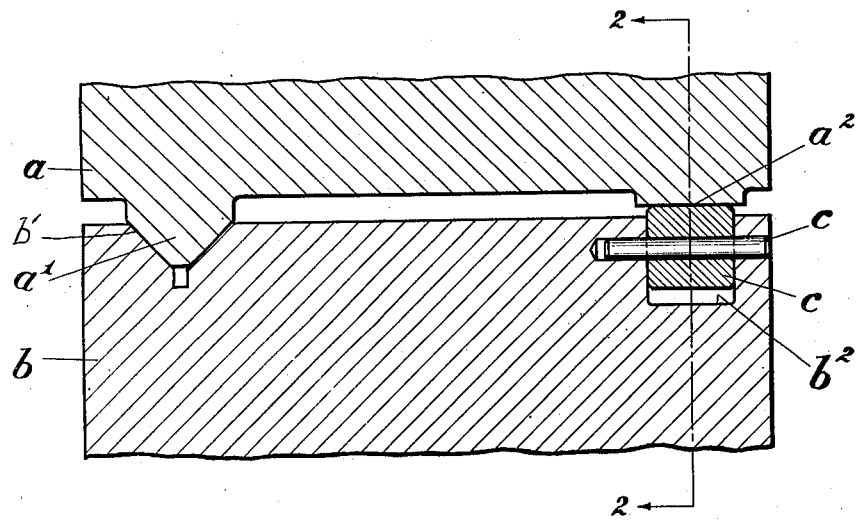
Figure 1 is a transverse sectional view illustrating a partial application of the invention.
Figure 2:
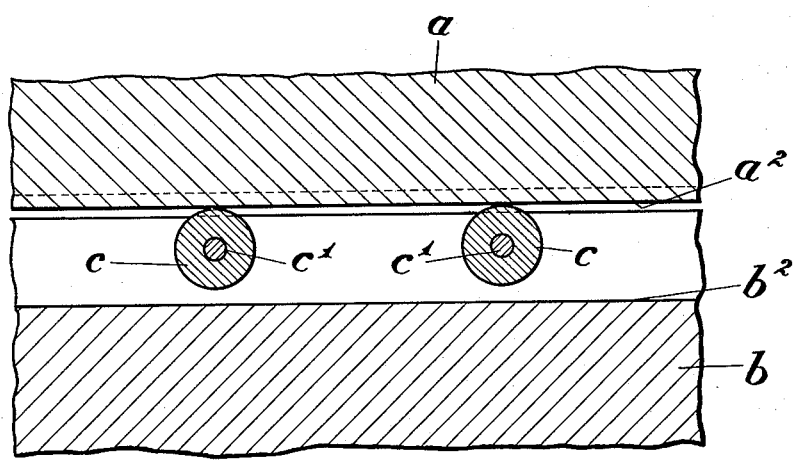
Figure 2 is a longitudinal sectional view of the same taken on the line 2—2 of Figure 1.

In the arrangement shown in Figures 1 and 2 the movable member $a$, which may be the main slide or the headstock of, say, a grinding machine, is formed adjacent one edge with the usual longitudinal V-section bearing rib $a^1$ which is adapted to slide in a correspondingly formed V-section groove $b^1$ in the relatively stationary member $b$, which may be the bed of the aforesaid grinding machine. At the other side the plain bearing face $a^2$ of the movable member instead of making a sliding contact with a plain surface on the member $b$, as at present, is supported therefrom by means of a series of spaced rollers $c$ which are free to rotate about axes arranged at right angles to the direction of movement of the member $a$ and are mounted upon spindles $c^1$ within a longitudinal groove $b^2$ formed in the stationary member $b$. By means of this arrangement which substitutes a rolling for a sliding motion and a series of transverse line contacts for a continuous surface contact, the movable member is rendered very sensitive to any force tending to set it in motion.

Figure 3:
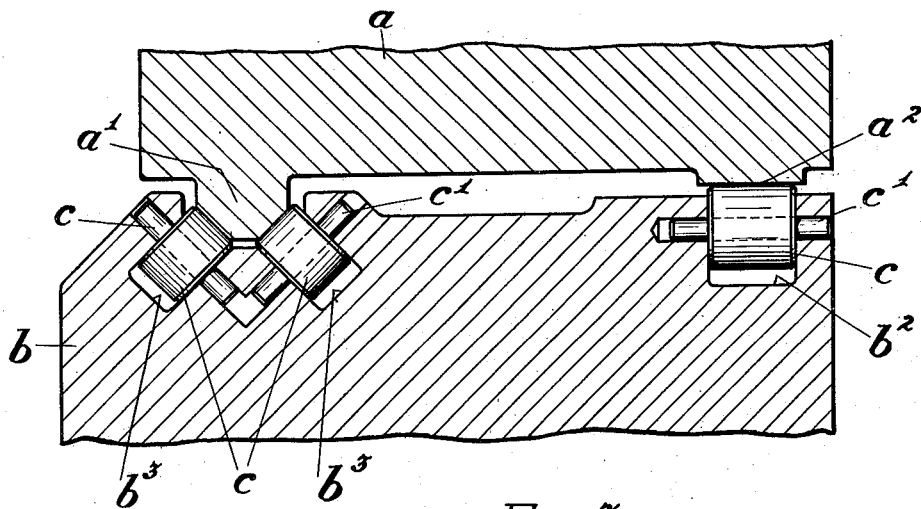
Figure 3 is a view similar to Figure 1 illustrating a complete application of the invention.
Figure 4:
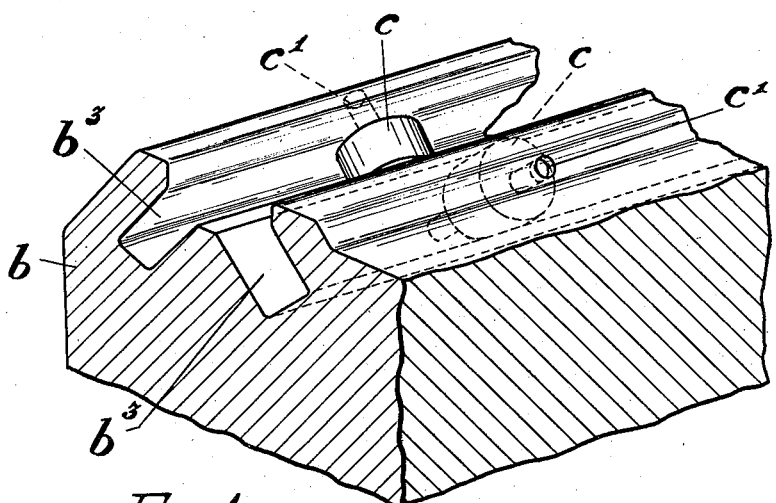
Figure 4 is a perspective view of the stationary member shown in Figure 3.

As will be seen in Figures 3 and 4 the same principle can also be applied to the V-section bearing $a^1$, $b^1$, by substituting a series of inclined rollers for the previous continuous surfaces of the V-section groove. For this purpose the relatively stationary member $b$ is formed with a pair of parallel longitudinal grooves $b^3$ which in cross-section are formed at an angle to each other corresponding with the contained angle of the V-section rib $a^1$ on the movable member $a$. Each of these grooves is fitted with a series of spaced rollers $c$ against the peripheries of which the inclined surfaces of the said rib take a bearing. Each roller is mounted on a spindle $c^1$ carried by the member $b$ and arranged with their axes parallel with the faces of the V-section rib so that the member $a$ moves along the member $b$ with a true rolling contact.

The grooves $b^2$, $b^3$ in the relatively stationary member also serve as oil reservoirs for the rollers.

It is to be understood that the adoption of roller bearings according to the present invention is to eliminate the present tendency for the highly finished surfaces of the two members to adhere together when stationary especially where the weight of the movable member and hence the pressure between the contacting surfaces is considerable and it is desired to provide for delicate adjustment thereof.

I claim:—

1. Relatively sliding upper and lower members, one of which has a longitudinal V-section groove, a V-section bearing rib carried by the other member and normally received in said groove, and one of said members being provided with a longitudinally extending plane bearing surface, in combination with a longitudinal series of spaced cylindrical bearing rollers rotatably carried by the other member and engaging said plane bearing surface in a plane between the opposed faces of said members, said rollers supporting the upper member, and the axes of said roller bearings being disposed at right angles to said rib and groove.

2. Relatively sliding upper and lower members, the upper member having a longitudinal V-section bearing rib and a plane bearing surface and the lower member being formed with two longitudinally parallel grooves, and means on said lower member for engaging and slidably supporting said plane bearing surface in a plane above the adjacent surface of the lower member, in combination with a series of spaced bearing rollers rotatably mounted in each of said grooves with their axes parallel with the inclined faces of said V-section bearing rib on the upper member, said rollers and supporting means taking the entire weight of the upper member.

3. Relatively sliding upper and lower members, the upper member having a longitudinal V-section bearing rib and a longitudinal plane bearing surface substantially parallel to said rib, and the lower member being formed with a longitudinal groove in vertical registry with said plane bearing surface of the upper member and a pair of longitudinally parallel grooves in the vicinity of the V-section bearing rib on said upper member, in combination with a series of bearing rollers respectively mounted for rotation about fixed axes in the first above mentioned groove with their axes at right angles to the length thereof and respectively extending above the adjacent portion of the lower member to maintain the opposed faces of said members in spaced relation, and a series of cylindrical bearing rollers mounted in each of said grooves of said pair of grooves with their axes parallel with the respective inclined faces of said V-section rib, said rollers collectively supporting the entire weight of said upper member.

4. Relatively sliding upper and lower members, one of which has a longitudinal V-section groove, a V-section rib carried by the other member and received in said groove, and a plane bearing surface carried by the lower face of said upper member, in combination with a longitudinal series of spaced rollers mounted for rotation about fixed axes in said lower member and respectively extending above the adjacent surface of the lower member and engaging said plane bearing surface to slidably support said upper member, the axes of said rollers being disposed at right angles to the path of normal movement of said upper member.

STANLEY J. HARLEY.